Jan. 21, 1936.  W. H. GRANT  2,028,150
MEANS FOR CORRUGATING TUBES
Original Filed April 19, 1932  10 Sheets-Sheet 5

Inventor:
William H. Grant
By: Brown, Jackson, Boettcher
  + Dienner,
  Att'ys.

Jan. 21, 1936.  W. H. GRANT  2,028,150
MEANS FOR CORRUGATING TUBES
Original Filed April 19, 1932   10 Sheets-Sheet 6

Inventor:
William H. Grant
By: Brown, Jackson, Boettcher &
Dienner.
Atty's.

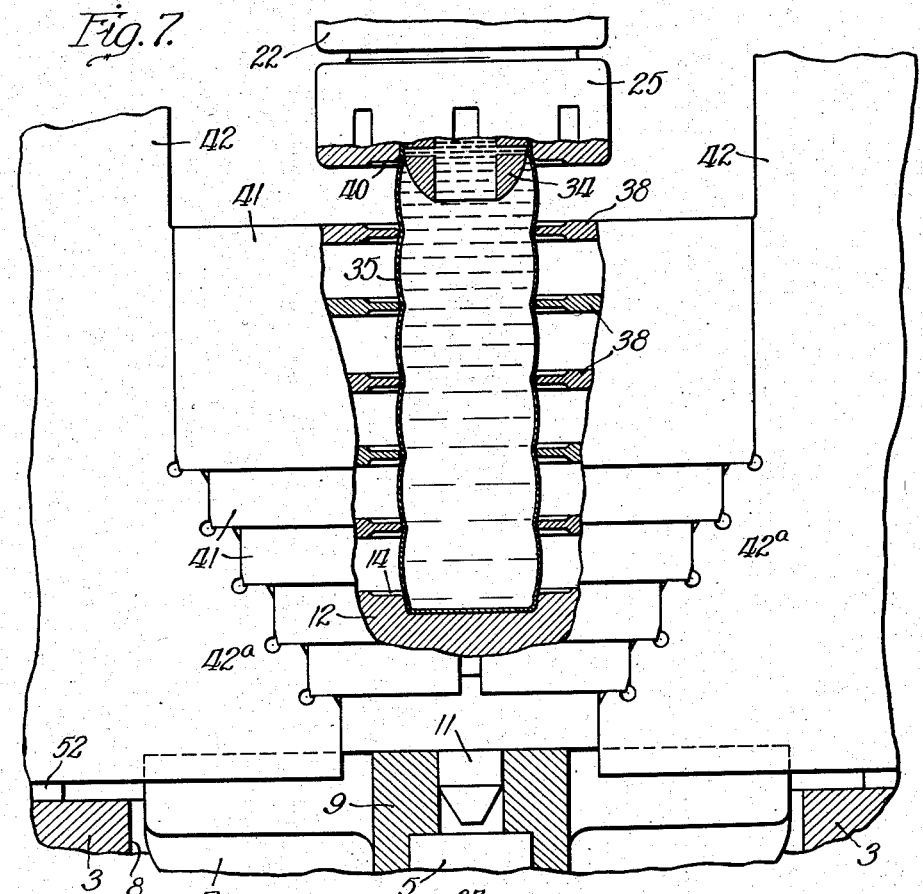
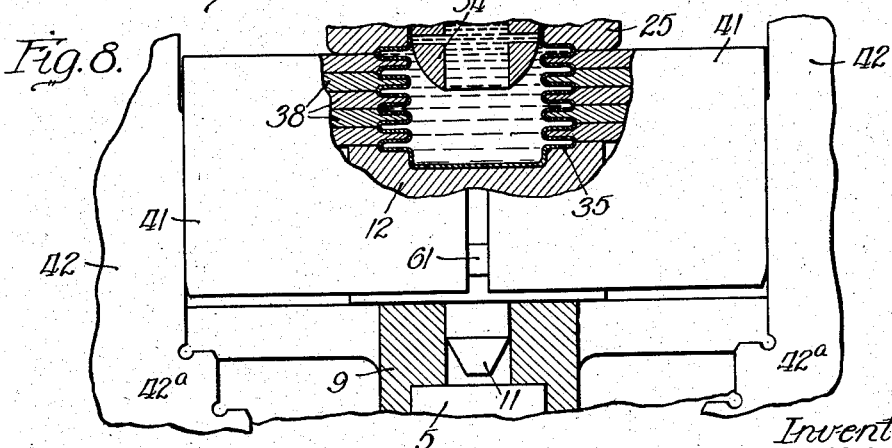

Jan. 21, 1936.                W. H. GRANT                2,028,150
                        MEANS FOR CORRUGATING TUBES
              Original Filed April 19, 1932    10 Sheets-Sheet 8
Fig. 9.
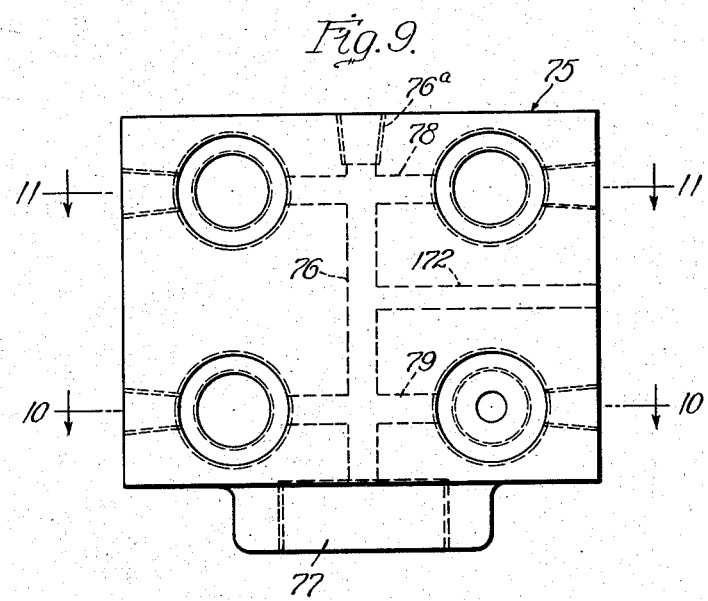
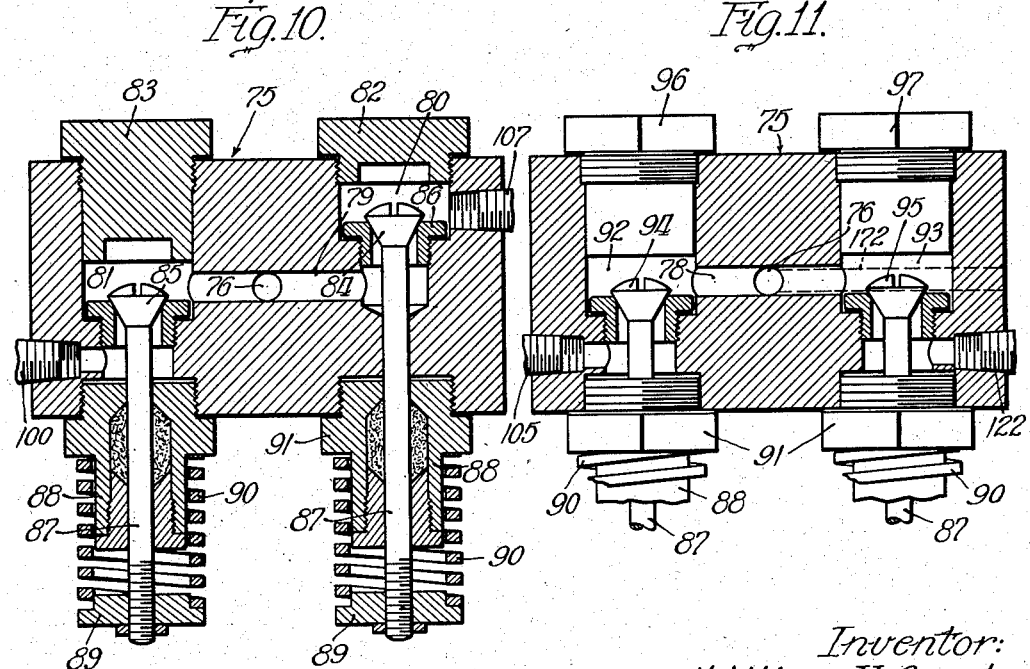
Fig. 10.            Fig. 11.
Inventor:
William H. Grant
By: Brown, Jackson, Boettcher & Dienner,
Attys.

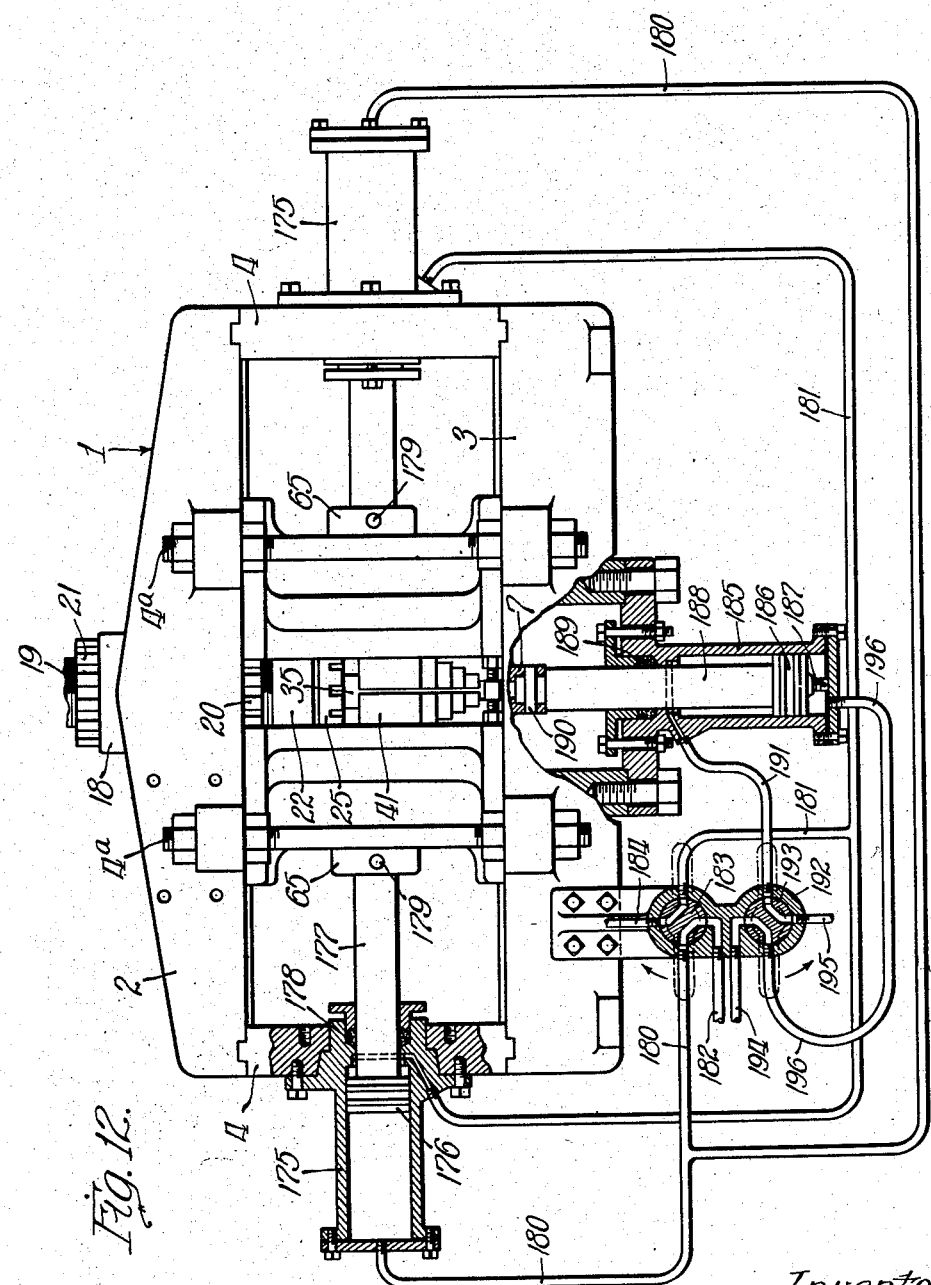

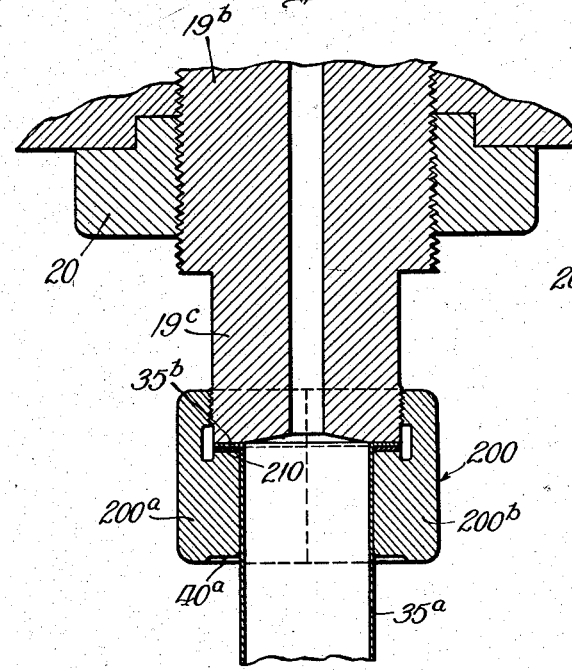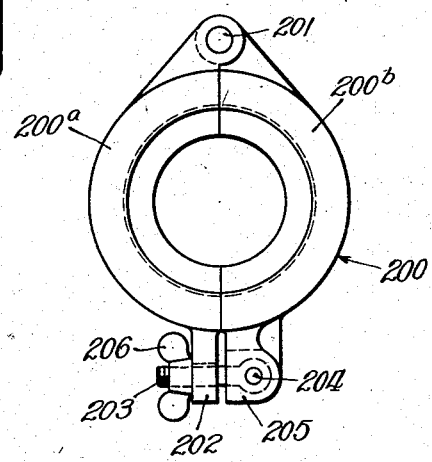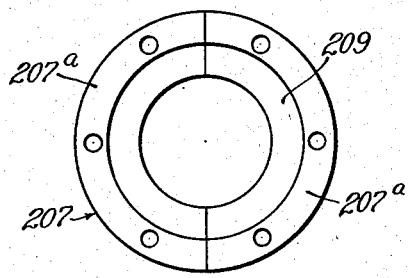

Patented Jan. 21, 1936

2,028,150

UNITED STATES PATENT OFFICE 2,028,150

MEANS FOR CORRUGATING TUBES

William H. Grant, Cleveland, Ohio, assignor to The Bishop & Babcock Manufacturing Company, Cleveland, Ohio, a corporation of Ohio Application April 19, 1932, Serial No. 606,117
Renewed October 11, 1934

17 Claims. (Cl. 153—73)

This invention relates to metallic bellows such as are used in thermostats and for analogous purposes, and has to do with a machine for corrugating tubular metal blanks to produce bellows of the character stated.

It is an object of my invention to provide means for corrugating tubular metal blanks by subjecting the blank to internal pressure and to axial pressure, while positioned between spaced mold sections extending about the blank, whereby the blank is expanded radially between the mold sections and is compressed axially so as to produce the desired corrugations. Another object of my invention is to provide improved means of comparatively simple construction and operation for effecting the corrugation of the tubular metal blank in the manner stated. Further objects and advantages of my invention will appear from the detailed description.

In the drawings:—

Figure 7 is an elevation of the die assembly and associated parts, partly broken away and in section, illustrating the first step of the method of my invention;

Figure 8 is a view similar to Figure 7 illustrating the final step in the corrugating of the tube in accordance with my method;

Figure 9 is a front view of the valve block;

Figure 10 is a section taken substantially on line 10—10 of Figure 9;

Figure 11 is a section taken substantially on line 11—11 of Figure 9;

Figure 12 is a front view, partly broken away and in section, illustrating a modified form of corrugating machine in which the parts are operated hydraulically;

Figure 13 is a vertical sectional view through the pressure head and the pressure inlet tube, and associated parts, illustrating a modification for corrugating a tubular metal blank open at both ends and provided with end flanges;

Figure 14 is a plan view of the nut for securing the upper end of the blank;

Figure 15 is a plan view of the lowermost die section in the modified form illustrated in Figure 13.

Figure 1:
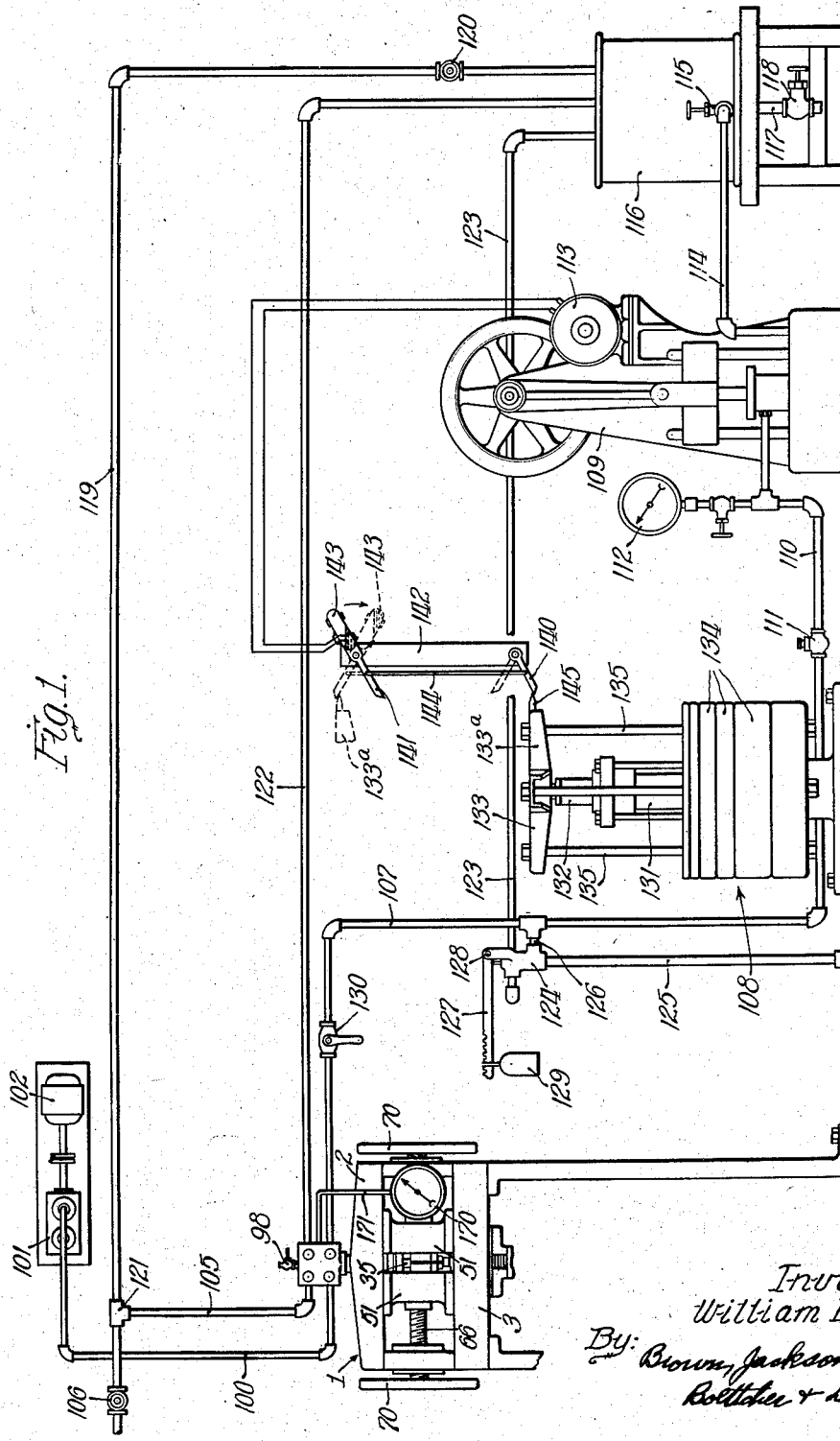
Figure 1 is a semi-diagrammatic view of a tube corrugating machine in accordance with my invention, and the auxiliary mechanisms used therewith, the machine proper being shown in elevation.
Figure 2:
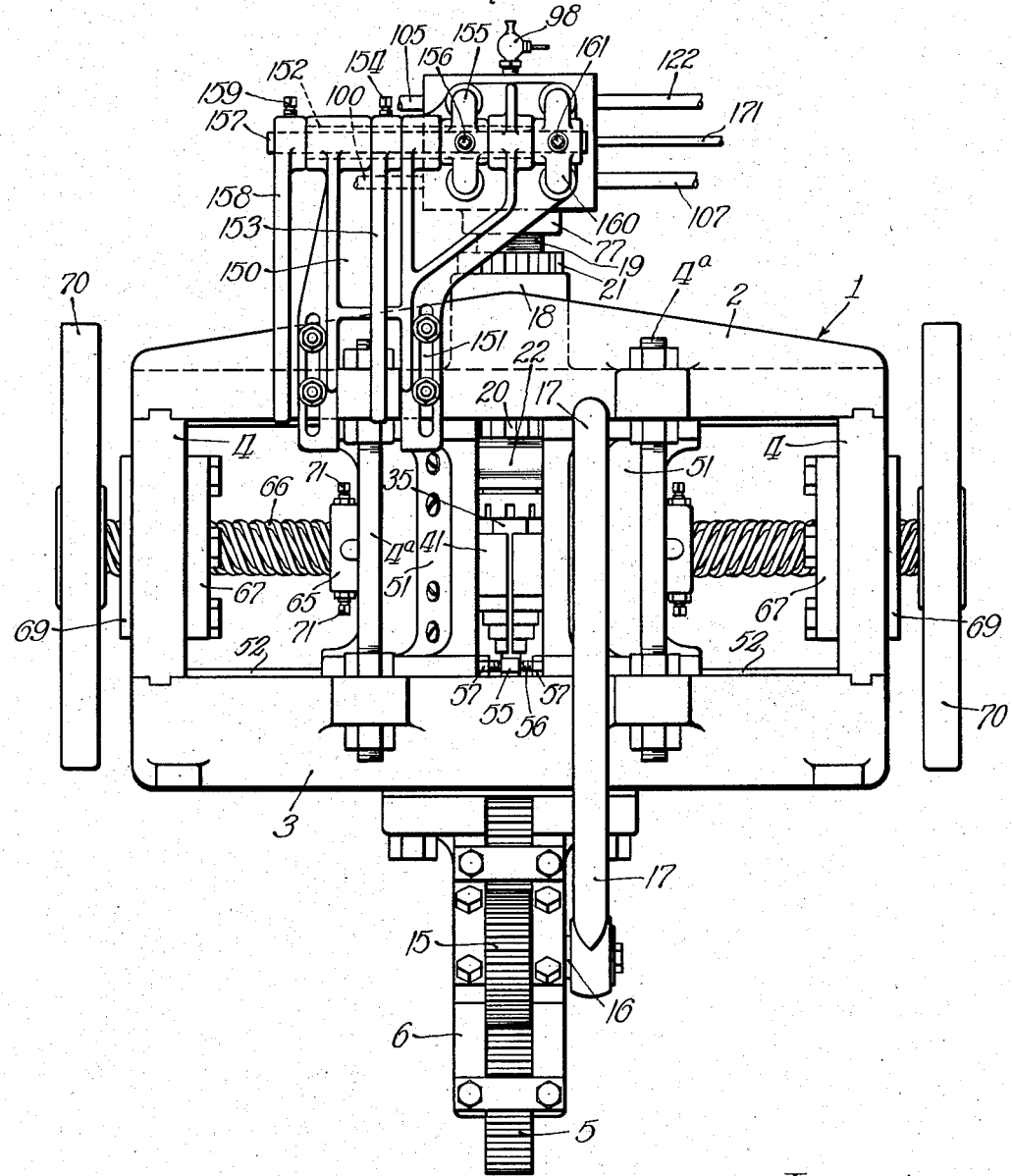
Figure 2 is a front view of the machine.

The machine comprises a rectangular frame 1 including a top plate 2, base 3, and side plates 4, all suitably secured together as by bolting or in any other suitable manner. Preferably the top plate 2 and base plate 3 are connected, at the front and back of the frame, by tie rods 4a which act as tension members to resist vertical stresses to which the frame is subjected. A rack bar 5 is slidably mounted in a bracket 6 bolted to base plate 3 at the under face thereof. A six-armed spider 7 seats upon the upper end of rack bar 5 and operates through an opening 8 in the base plate 3. This spider is provided with a central hub 9 from the lower end of which extends an opening conforming in size and shape to the upper end of the rack bar. Hub 9 is further provided with a reduced bore 10 extending from the upper end and axially thereof for reception of a stud 11 disposed centrally of the lower face of a cylindrical pressure head 12. This head is provided, in its upper face, with a central depression 13 for reception of the lower end of a tubular metal blank to be corrugated, and with a relatively shallow recess 14 extending outwardly from the depression and conforming in width to the width of the desired corrugation of the blank. The rack bar is moved vertically by means of a spur pinion 15 meshing therewith, this pinion being secured upon a shaft 16 upon one end of which is secured an operating lever 17. When the lever 17 is in the raised position of Figure 3, the rack bar 5 is in lowered position and the spider 7 and pressure head 12 occupy the positions shown in Figure 5.

Top plate 2 is provided with a central collar 18 extending upwardly therefrom and disposed centrally of the plate, this collar being coaxial with pressure head 12. A pressure inlet tube 19 extends through collar 18 and is secured therein, in endwise adjustment, by suitable nuts 20 and 21 which screw onto the inlet tube 19 and bear against the under face of plate 2 and the upper end of collar 18, respectively. A head 22 screws onto the lower end of tube 19, this head being provided with a bore 23 aligned with bore 19a of tube 19, a gasket 24 being disposed between the head and the lower end of tube 19, about bores 19a and 23. A flanged nut 25 screws onto a shoulder 26 adjacent the upper end of a reduced neck 27 extending from the lower end of head 22.

A clamping plug 28 is secured in head 22 by means of a reduced and threaded neck 29 which screws into an enlarged bore of the head, such bore forming a continuation of bore 23. Plug 28 is provided with a bore 31 extending from its lower end, from the upper end of which bore extends a reduced bore 32 aligned with bore 23 of the head. A suitable gasket 30 is disposed about the neck 29 and confined between the shoulder at the upper end of the plug and the adjacent under face of head 22. Neck 27 of the head is suitably bored from its lower end to provide a downwardly flaring recess 33 from the upper end of which extends a cylindrical recess of slightly greater diameter than plug 28. The lower end of the plug is rounded to provide a nose element 34 which facilitates positioning of a tubular metallic blank 35 over the plug, the upper end portion of this blank being inserted between the plug and the surrounding wall of the cylindrical recess in neck 27. A clamping ring 36 of leather or other suitable friction material fits about blank 35 and into the flared recess 33, the outer face of this ring being inclined similarly to the surrounding wall of the recess. The flange 25a of nut 25 engages beneath ring 36 so that when the nut is screwed onto neck 27 ring 36 is forced into recess 33 so as to grip the blank tightly about plug 28. By slightly loosening nut 25, the compression of ring 36 is released sufficiently to permit of insertion or withdrawal of the upper portion of the blank between the plug 28 and ring 36, without necessity for complete removal of nut 25 from neck 27. This gripping of the blank about plug 28 also serves to provide a fluid tight and pressure resistant closure between the blank and the plug. While the blank 35 is preferably inserted into neck 27 of the head until the upper end of the blank contacts the under face of the head adjacent the gasket 30, this is not essential so long as the upper end portion of the blank is disposed between plug 28 and the clamping ring 36. The plug is provided with ducts 37 extending radially thereof and opening into bore 31, nose element 34 being so shaped as to permit of air which might otherwise be trapped between the wall of the blank and the nose entering these ducts and thus escaping through the bores 19a and 23, 32 and 31. The lower closed end of blank 35 seats in recess 13 of pressure head 12.

The blank 35 is disposed between die members 38 which are spaced apart lengthwise of the blank and encircle the latter. Each of these die members is provided with an annular recess 39 in each face and extending from the inner edge thereof, this recess conforming in depth to one-half of the depth of a desired corrugation to be produced in the blank 35, and in width to the width of the desired corrugation. Flange 25a of nut 25 is also provided with a recess 40 corresponding to the recesses 39 of the die members. When flange 25a of nut 25 and the die members 38 and pressure head 12 are moved into contacting relation, the recesses thereof define die cavities corresponding in size and shape to the corrugations which it is desired to produce in the blank 35.

Each of the die members 38 comprises semicircular sections 38a which constitute a circular die. These dies decrease in diameter from the top die to the bottom die and are suitably mounted, as by tongue and groove means, in semicircular holders 41 to which the die sections are pinned or otherwise suitably secured. The holders associated with each die constitute a supporting ring therefor. The top holder 41 is slidably secured for vertical movement to supports 42, by means of headed and shouldered screws 43 which pass through suitable slots 44 and 45 in the holder 41 and screw into the supports 42. The lower portion 42a of each support 42 is of stepped formation to provide stops upon which the successive holders 41 normally rest. The remaining holders 41 are successively connected together for relative vertical sliding movement in the same manner as the top holder is connected to the support 42, the screws for connecting the successive holders together preferably being offset relative to each other and to the screws which connect the top holder 41 to the support. The holders for the dies are thus connected for relative vertical movement and are disposed in nested relation. Preferably, each of the die sections 38, with the exception of the lowermost die section, is provided with a plurality of suitably disposed guide pins 46 slidable in suitable bores extending from the upper face of the holder for the next succeeding die section. These pins, though not essential, contribute to holding the die sections accurately in vertical alignment one with the other. The lowermost die ring is of relatively small diameter and requires no guiding means other than its associated holding ring. The pressure head 12 fits snugly within the ring of this lowermost die section so as to be guided thereby in the axial compressing of the tubular blank.

The supports 42 fit snugly into vertically grooved lugs 50 of cross-heads 51, to which the supports are bolted or otherwise suitably secured. The cross-heads 51 are of arcuate cross-section and of less than 180 degrees in extent. These cross-heads are slidably mounted on the base plate 3 of the frame and are provided, at their under faces, with ribs or extensions which operate in guideways 52 of plate 3 (Figs. 4 to 7) for guiding the heads during movement thereof, in a known manner. Stop members 54 are suitably secured in guideways 52, each of these members including a laterally and outwardly projecting stop block 55. Blocks 55 are so disposed that the transverse centers thereof are in the plane of the axis of pressure head 12 and head 22 taken from front to back of frame 1 and perpendicular thereto. Screw studs 56 are adjustably secured by jam nuts 57 in lugs 58 of each head 51, at the front and the back thereof. These studs 56 provide adjustable means cooperating with the blocks 55 for assuring that the ends of the semicircular die sections 38a and die holders 41 are accurately disposed in contacting relation when the heads have been moved into their extreme positions toward each other, while avoiding subjecting the die sections and holders to objectionable stresses by movement of the heads toward each other.

The holders 41 are provided, at the ends thereof, with guide studs 60 and with bores for reception of such studs. Preferably, the studs and bores at the ends of each of the two holders 41, constituting a holding ring, are alternately related with a view to assuring greater accuracy in aligning of the holders. Each of the studs is preferably provided with a shoulder 61 which constitutes a spacing element of proper thickness to contact the ends of the holders 41, which are thus slightly spaced apart when the adjacent ends of the die sections 38a are in accurate and close contact, but without the die sections being placed under objectionable pressure. I also preferably provide each of the die sections 38a with a guide pin 62 (Fig. 6) which engages into a corresponding bore in the adjacent end of the other die section. These pins 62 are disposed outwardly beyond the recesses 39 and, preferably, one of the pins is carried by one of the die sections, the other pin being carried by the other die section. The die assembly construction illustrated and described assures that the die sections of the respective die rings will be accurately closed and disposed about the tubular blank when the cross-heads 51 occupy the position illustrated in Figure 6, while avoiding subjecting the die sections to objectionable stresses.

Each of the heads 51 is provided, at the outer side and centrally thereof, with an integral boss 65. This boss receives the rounded inner end portion 66a of a screw shaft 66 which threads through a flanged bushing 67 which extends through and is bolted to side member 4 of frame 1. The outer end of bushing 67 fits into a flanged collar 69 bolted to member 4. A hand wheel 70 is suitably secured upon the outer end of shaft 66. Dog pointed screws 71 are suitably secured thru boss 65 and extend in front of a collar 72 on end portion 66a of shaft 66. A pressure disc 73, disposed in a recess 74 in the boss, is contacted by the rounded inner end of shaft 66. The shaft is thus connected to the cross-head for adjusting the latter toward and away from the center of frame 1.

A valve block 75 is screwed or otherwise suitably secured upon the upper end of tube 19. Referring more particularly to Figures 9 to 11, inclusive, this block is provided with a central passage 76 which opens, at its lower end, into neck 77 which screws upon the upper end of tube 19. This passage 76 is intersected, adjacent each end thereof, by upper and lower passages 78 and 79, respectively. Passage 79 opens at its ends into valve chambers 80 and 81, access to which may be had by means of suitable screw plugs 82 and 83, respectively. Valves 84 and 85 are disposed in the chambers 80 and 81, respectively. These valves are of similar construction and each valve seats in a thimble 86 which screws into the chamber and is shaped to provide a seat for the valve. The block is suitably bored coaxially with the valve chamber to accommodate stem 87 of the valve, this stem operating through a suitable stuffing box structure 88 in a known manner. A flanged disc 89 is suitably secured upon the outer end of valve stem 87 and an expansion coil spring 90, disposed about the stuffing box 88, is confined between this disc and a shoulder 91 of the stuffing box structure. This spring serves normally to hold the valve seated. Passage 78 opens into valve chambers 92 and 93 in which are located the valves 94 and 95, respectively, access to which may be had by means of screw plugs 96 and 97, respectively. The valves are of similar construction and operation. The upper end of passage 76 is suitably bored and threaded at 76a for reception of a pet cock 98 of known type for a purpose to be later disclosed.

A suction pipe 100 communicates with valve chamber 81 below or in front of valve 85. This pipe 100 also communicates with a suitable source of suction, such as a suction pump 101 having driving connection with an electric motor 102 or other suitable source of power. By opening the valve 85 communication is established between the source of suction, by means of valve chamber 81, passages 79 and 76, and the tube 19 and associated parts, and the interior of the tubular blank 35 for exhausting air from the same preliminary to filling it with water or any other suitable incompressible fluid under pressure. A water supply pipe 105 communicates with valve chamber 92 below or in front of valve 94. This pipe is connected to a suitable supply of water under pressure, such as the ordinary water pipe connected to the street main. A valve 106 of known type is provided in pipe 105 for controlling the flow of water therethrough. After the air has been exhausted from the tubular blank, this blank may be filled with water from pipe 105 by opening valve 106 and then opening valve 94. Normally, valve 106 remains open, it only being necessary to open valve 94 to admit the water to the blank.

A pressure supply pipe 107 communicates with valve chamber 80 above or in back of valve 84. This pipe communicates with the outlet of an accumulator or equalizer 108 for supplying liquid under constant pressure to the pipe 107. Water is supplied to the accumulator by a pump 109 of suitable type, the outlet of which is connected by a pipe 110 to the inlet of the accumulator. A suitable check valve 111 is interposed in pipe 110 and a pressure gauge 112 is connected to this pipe between the pump outlet and the check valve. The pump is driven by an electric motor 113 and the inlet of the pump is connected by a pipe 114, in which is interposed a suitable valve 115, to a supply tank 116. This tank is provided with a drain pipe 117 controlled by a suitable valve 118. A supply pipe 119, provided with a control valve 120, is connected by a T 121 to pipe 105 and discharges into the tank 116 for supplying water thereto as required. A pressure release pipe 122 communicates with tank 116 and with valve chamber 93 below or in front of valve 95. An overflow pipe 123 communicates with tank 116 and with a relief valve structure 124 supported by a standard 125 and communicating at 126 with pipe 107. The valve structure 124 includes a loaded relief valve normally held closed by a lever 127 pivoted at 128, a weight 129 being adjustably mounted on this lever. Under normal conditions, the relief valve remains closed, but if the pressure in pipe 107 exceeds a predetermined maximum, the relief valve is opened and the water or other incompressible fluid thus released is returned by pipe 123 to the tank 116. A suitable control valve 130 is disposed in pipe 107 and placed so as to be readily accessible to the operator of the machine.

The accumulator 108 is of known type and comprises a cylinder 131 in which operates a piston 132, this piston having mounted at the upper end thereof a multiple armed head 133 from which suitable weights 134 are suspended by means of rods 135. Water or other suitable incompressible fluid pumped into the cylinder 131 forces the piston 132 upwardly and is placed under constant pressure by the weight 134 and associated parts. The accumulator thus provides a source of supply of liquid under substantially constant and predetermined pressure, which liquid may be admitted to the tubular blank by opening the valve 84. It is to be noted that when valve 84 is opened, the resulting pressure in the passages and valve chambers of the block 75 acts to hold the other valves of this block seated or closed, this pressure supplementing the action of the valve springs 90.

Preferably, I provide means for automatically controlling the circuit of motor 113 in accordance with the position of head 133 of the accumulator. Two arms 140 and 141 are pivotally mounted at one end on a bracket 142. Arm 141 supports for movement therewith a mercury tube switch 143 of known type which is interposed in the circuit of motor 113. A rod 144 connects the arms 140 and 141 for similar movement. A trip finger 145 projects from arm 133a of head 133 and is disposed to contact the arms 140 and 141. This finger is suitably disposed and shaped to pass by each arm after actuation thereof. As the head 133 approaches the limit of its upward movement, finger 145 contacts arm 141 and rocks it into the dotted line position of Figure 1, thus rocking this arm and tilting the switch 143 into circuit opening position, indicated by dotted lines, after which the finger may pass beyond arm 141. This opens the circuit of motor 113, thus throwing the pump 109 out of operation and eliminating possibility of injury to the accumulator such as might result from continued operation of the pump when piston 132 has been moved into its uppermost position, particularly if the relief valve of structure 124 failed to open for any reason at the pressure for which it is set. The pump remains out of operation until piston 132 of the accumulator moves downwardly to a predetermined extent, at which time finger 145 actuates arm 140 so as to rock arm 141 and switch 143 into circuit closing position, thus setting the pump into operation. Arm 140 is preferably of proper length to clear the finger 145 as it passes downwardly beyond this arm after the latter has been rocked into the full line position of Figure 1. This provides an automatic control for throwing the pump 109 into and out of operation, as conditions require, and to maintain the proper supply of water or other liquid to the accumulator, the pump being operated intermittently.

Figure 3:
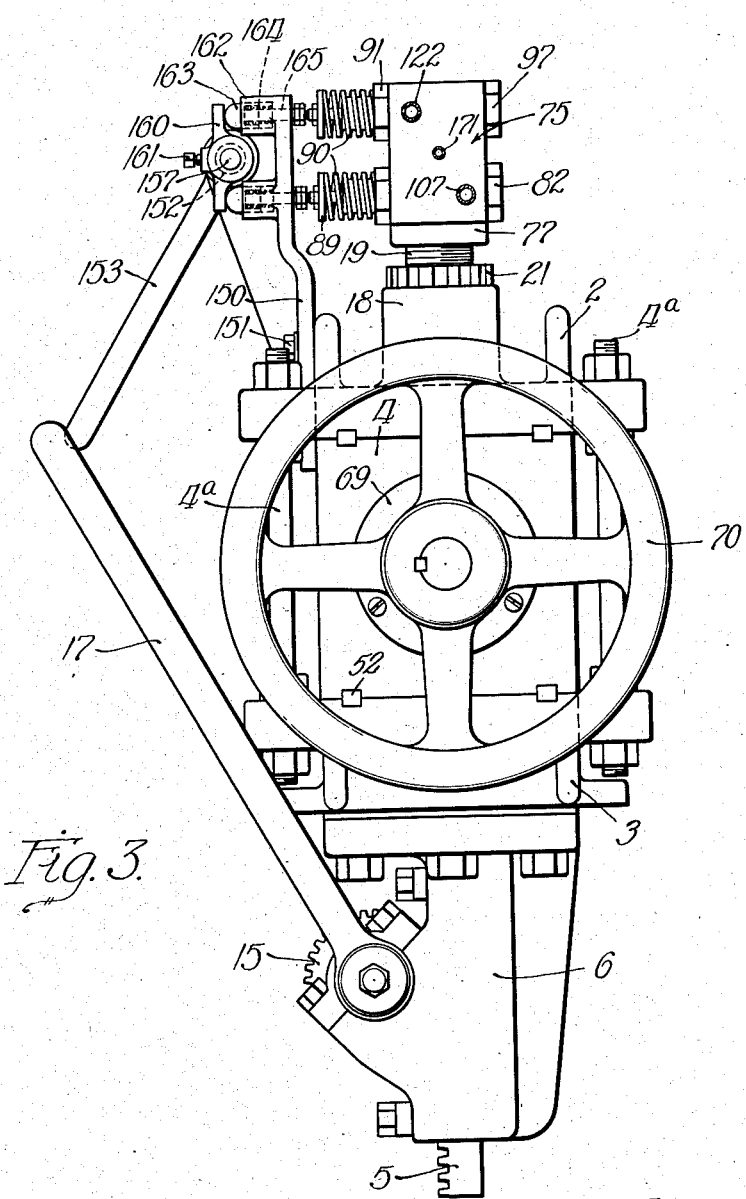
Figure 3 is a side view of the machine.
Figure 4:
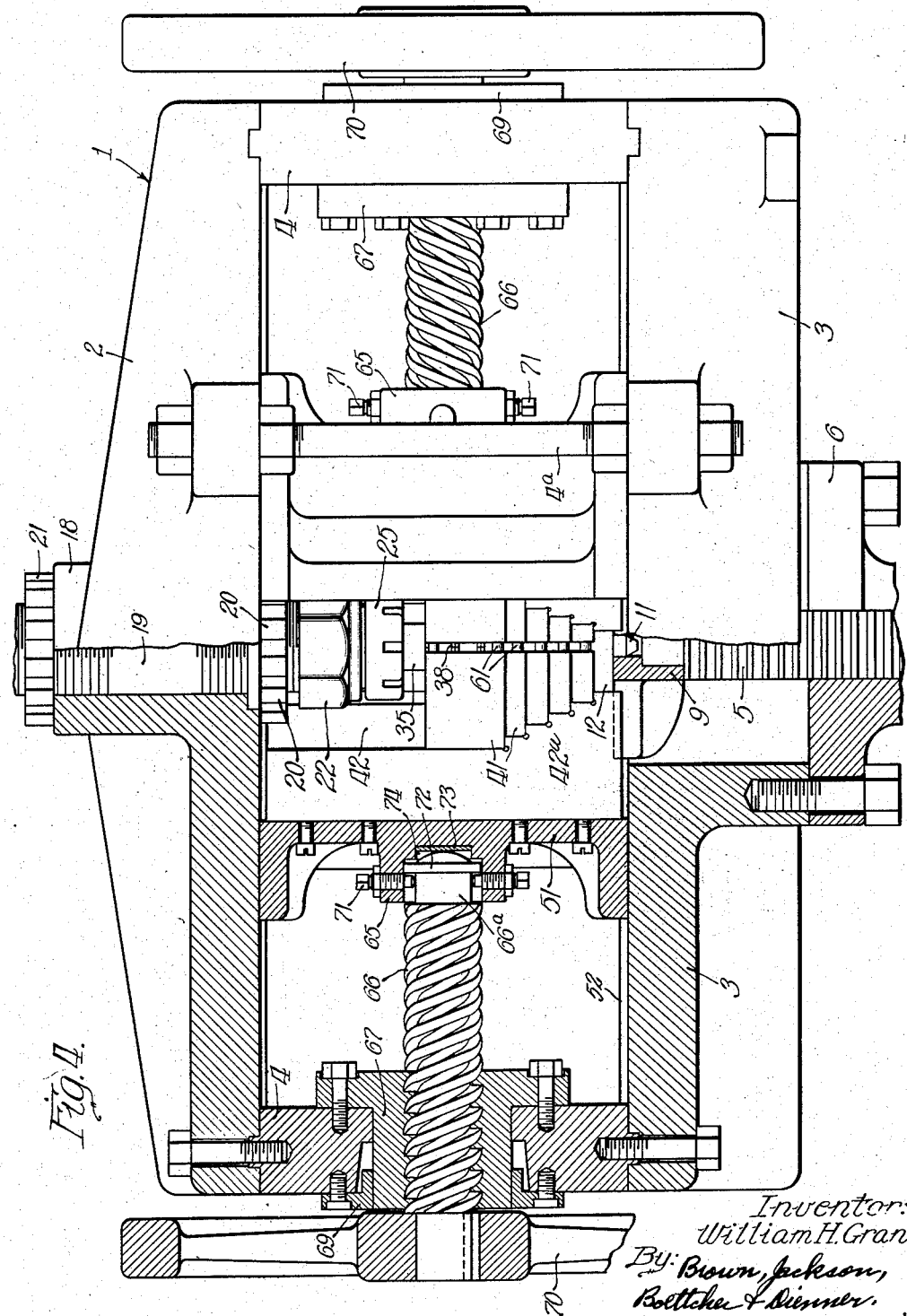
Figure 4 is a front view of the machine on an enlarged scale, partly broken away and in section, parts being shown in elevation.

A bracket 150 is suitably secured to the front of top plate 2 of the frame 1 for vertical adjustment, as by bolt and slot means 151. This bracket rotatably supports a tubular shaft 152 to which an operating lever 153 is secured by a set screw 154, or in any other suitable manner. A two-armed member 155 is suitably secured on shaft 152 for movement therewith, as by means of a set screw 156. A shaft 157 is rockably mounted through the tubular shaft 152. An operating lever 158 is suitably secured upon one end of shaft 157, as by means of a set screw 159. A two-armed member 160 is secured upon the other end of shaft 157 by means of a set screw 161. The bracket 150 is provided with forwardly projecting bosses 162 which are suitably bored for reception of plungers 163, the forward portions of which are rounded as shown in Figure 3. These plungers are urged forwardly by expansion coil springs 164 disposed about the stems 165 of the plungers and confined between the heads of the latter and the inner ends of the bosses. The stems 165 of the plungers are disposed coaxially with the stems 87 of the valves in the blocks 75, the rearward ends of plungers 165 being in close proximity to the forward ends of the valve stems. Upon rearward movement of any of the plungers 163 the corresponding valve of the block 75 is opened, and upon release of the plunger this valve is returned to seated or closed position.

Preferably, I provide a gauge 170 of suitable type for indicating the pressure in passage 76 of the block and in the tubular blank. This gauge is conveniently of proper type to indicate pressure above atmospheric produced by the liquid supplied under pressure from pipe 107, and to indicate also pressure below atmospheric to indicate the degree of partial vacuum produced by the suction means. The gauge 170 is connected by a tube 171 to a passage 172 bored in the block 75 from one side thereof and intersecting the passage 76.

In the use of the machine, the cross-heads 51 are moved outwardly into positions adjacent the sides of frame 1 so as to give ready access to pressure head 12 and clamping head 22 and associated parts. The pressure head 12 may be moved downwardly beyond its normal position shown in Figure 5, by raising the lever 17, after which the upper end portion of the blank 35 is secured in the clamping head 22 in the manner previously described. Lever 17 is then moved downwardly slightly so as to raise the pressure head 12 into position such that the lower end of the blank seats in the depression 13. The cross-heads 51 are then moved inwardly toward each other into their innermost position, thus disposing the die rings 38 about the blank 35 as in Figure 5. The tubular blank 35 is now in position to be corrugated, with the die assembly closed and the die members or rings disposed about the blank in operative relation thereto and so as to encircle completely the blank.

With the blank in position and the die assembly closed, the operator first depresses lever 153, thus opening valve 85, which may be termed the suction valve, and connecting the interior of the blank to the suction pump 101. This pump acts to exhaust the greater portion of the air from the tubular blank as well as the passages and spaces of the valve block and tube 19 and associated parts, within a short time. It should be here noted that the pet-cock 98 is normally closed. The operator then swings lever 153 upwardly, thus closing suction valve 85 and opening valve 94, which may be termed the supply valve, admitting water or other suitable liquid through pipe 105 and the passages of the block and of tube 19 and associated parts into the tubular blank 35. This blank and the various passages and spaces communicating therewith are thus quickly filled with water. The pet-cock 98 forms convenient means for indicating when the blank and the passages of the valve block and associated parts have been completely filled with water, which may readily be determined by opening the pet-cock briefly. This pet-cock also provides means for releasing any small volume of air which may be trapped in the upper portion of passage 76. Lever 153 is then released, thus closing the supply valve 94. The operator then opens valve 130, if this valve is closed, and then depresses lever 158 opening the valve 84 which may be termed the high pressure valve. This admits the liquid or incompressible fluid from pipe 107 into the passages of the valve block and thence into the tubular blank 35. The weights 134 of the accumulator 108 are of such value that the pressure within the blank 35, when the valve 84 is opened, is of proper value to bulge the blank 35 outwardly slightly between the die rings and pressure head 12 and flange 25a of nut 25, as in Figure 7. The operator then swings lever 17 downwardly, while holding the lever 158 depressed so as to maintain the pressure within the tubular blank. This raises the spider 7 and the pressure head 12, thus subjecting the blank 35 to endwise pressure so as to compress it axially while subjected to internal pressure. As the head 12 moves upwardly, the metal of the blank which is displaced by the axial compression thereof is redistributed outwardly and radially of the blank between the die rings, and these rings are successively raised by contact of the arms of spider 7 with the holders 41, the arms of the spider moving upwardly between the supports 42. As the pressure head 12 reaches its uppermost position, the die rings are brought into contact with one another, the upper face of the top die ring contacting the under face of flange 25a of nut 25 and the upper face of head 12 contacting the under face of the lowermost die ring. The corrugations of the tube are thus shaped to conform to the recesses defined by the rings and head 12 and the flange 25a of nut 25, as in Figure 8. The water or other liquid displaced by the axial compression of the tube is forced through the pipe 107 into the accumulator 108. If the pressure rises beyond the predetermined maximum during the axial compression of the tubular blank, the relief valve opens and the excess water is returned through pipe 123 to tank 116. After the blank has been thus corrugated, the operator raises lever 158, thus closing the pressure valve 84 and opening the relief valve 95. This serves to relieve any pressure which might otherwise exist within the corrugated tube 35 due to the presence of air pockets or other causes, and any water displaced when the valve 95 is opened, is returned to tank 116 through pipe 122. The cross-heads 51 are then moved away from each other so as to withdraw the sections of the die rings from between the corrugations of the tube 35, and the lever 17 is raised so as to lower the pressure head 12. By slightly loosening the clamping nut 25 the corrugated tube may now be withdrawn therefrom and replaced by another tubular blank to be corrugated. When the sections of the die rings are withdrawn from the corrugations of the corrugated tube, these sections and the holders therefor return by gravity to their normal positions shown in Figure 5.

Since the holders 41 are free for relative sliding movement, the die rings 38 are free for relative movement. During the preliminary bulging of the blank between these rings, as in Fig. 7, the rings 38 have slight relative movement one toward the other to accommodate shortening of the blank incident to bulging thereof. This is advantageous in that it prevents objectionable thinning of the wall of the blank, such as would occur if the die rings were held against relative movement toward one another. The blank, after the preliminary bulging thereof, is in substantially the form shown in Fig. 7 and may be considered as comprising a plurality of contiguous segments each of which is arched but slightly lengthwise of the blank and offers considerable resistance to endwise compression thereof. In the upward movement of the rack bar 5 head 12 subjects the blank to endwise pressure applied directly to the lower end of the blank. The total resistance of the slightly bulged segments of the blank above the lowermost die ring 38, to endwise compression of the blank, is much greater than the resistance of the single lowermost segment between head 12 and the lowermost ring 38, and this lowermost segment is subjected to direct and positive pressure by the head. Since the lowermost segment of the bulged blank offers considerably less resistance than the remaining segments, the metal of this lowermost segment will flow radially between head 12 and the lowermost ring 38 until the head contacts the latter ring, thus accurately forming the lowermost preliminary corrugation of the blank to the final size and shape of the desired corrugations of the bellows being produced. When the lowermost corrugation has thus been formed to final size and shape, the arms of spider 7 contact the lower edge of holder 41 of the second die ring 38, thus subjecting the second segment of the bulged blank to direct and positive pressure and forming it to final size and shape in the same manner as the lowermost segment was formed to final size and shape. In the continued upward travel of rack bar 5 the arms of spider 7 contact the holders 41 successively so as to move the die rings 38 successively one toward the other and thus successively form the segments of the bulged blank to the final size and shape of the corrugations of the bellows being produced. With respect to forming of the next to the top corrugation, it is pointed out that the pressure to which the corresponding segment of the bulged blank is subjected is direct and positive and, therefore, has considerably greater effect on this segment than on the top segment of the bulged blank, with the result that the next to the top corrugation is formed accurately to the final shape and size of the corrugations of the bellows being produced, and thereafter the top corrugation is formed accurately to final size and shape between the top die ring and the nut 25.

The floating mounting of the die rings 38 has the further advantage that it accommodates any lack of uniformity in the preliminary bulging of the blank between the rings, due to slight differences in wall thickness or temper of different portions of the blank. In practice, it is difficult to produce a tubular blank of absolutely uniform temper and wall thickness, and portions of the blank are apt to differ in these respects. These differences exist, though they may at times be difficult to detect, and must be taken into account in producing the bellows, if maximum efficiency is to be attained. The floating mounting of the rings compensates for lack of uniformity in the blank and avoids objectionable stretching of the wall thereof.

When the bulged blank is subjected to endwise pressure in the forming of any one of the segments thereof to the final size and shape of the corrugations of the bellows being produced, other segments of the blank may be more or less extended radially with corresponding relative movement one toward the other of the corresponding die rings, depending upon the wall thickness of the blank and other factors. However, the segments of the bulged blank will be successively and individually formed to the final size and shape of the corrugations of the bellows being produced, in the manner above stated, which assures accuracy and uniformity of the corrugations in the bellows, and such radial extension of the segments of the bulged blank prior to forming thereof to the final size and shape of the desired corrugations is not objectionable and does not interfere with the desired precision of the corrugations finally produced. A further advantage of forming the bellows in this manner is that the production of the bellows may be performed as a continuous operation, and the power required to perform this operation is materially less than would be required if it were attempted to form all of the corrugations to final shape and size simultaneously.

Figure 5:
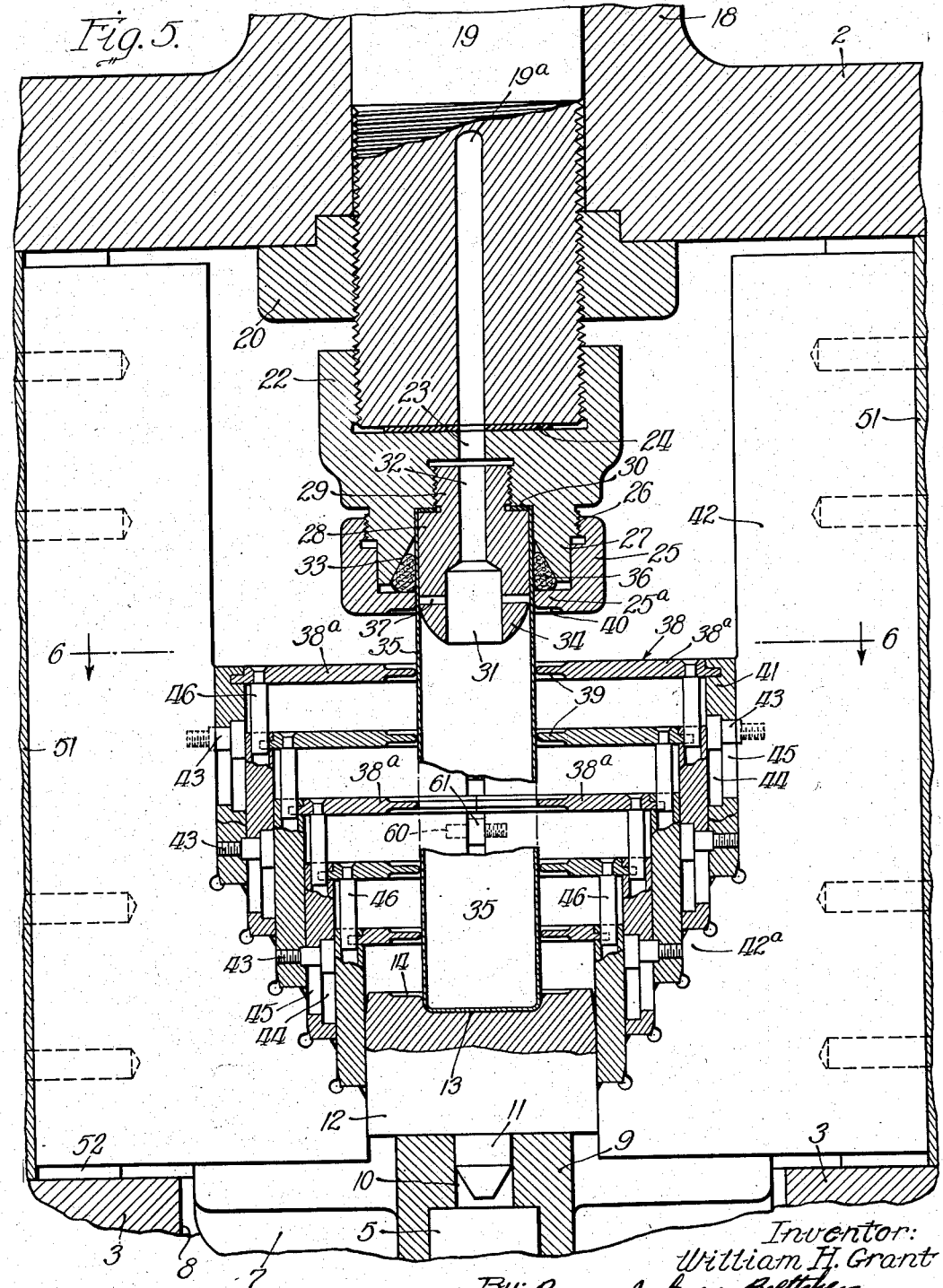
Figure 5 is a sectional view taken vertically through the die assembly and associated parts, parts being shown in elevation.
Figure 6:
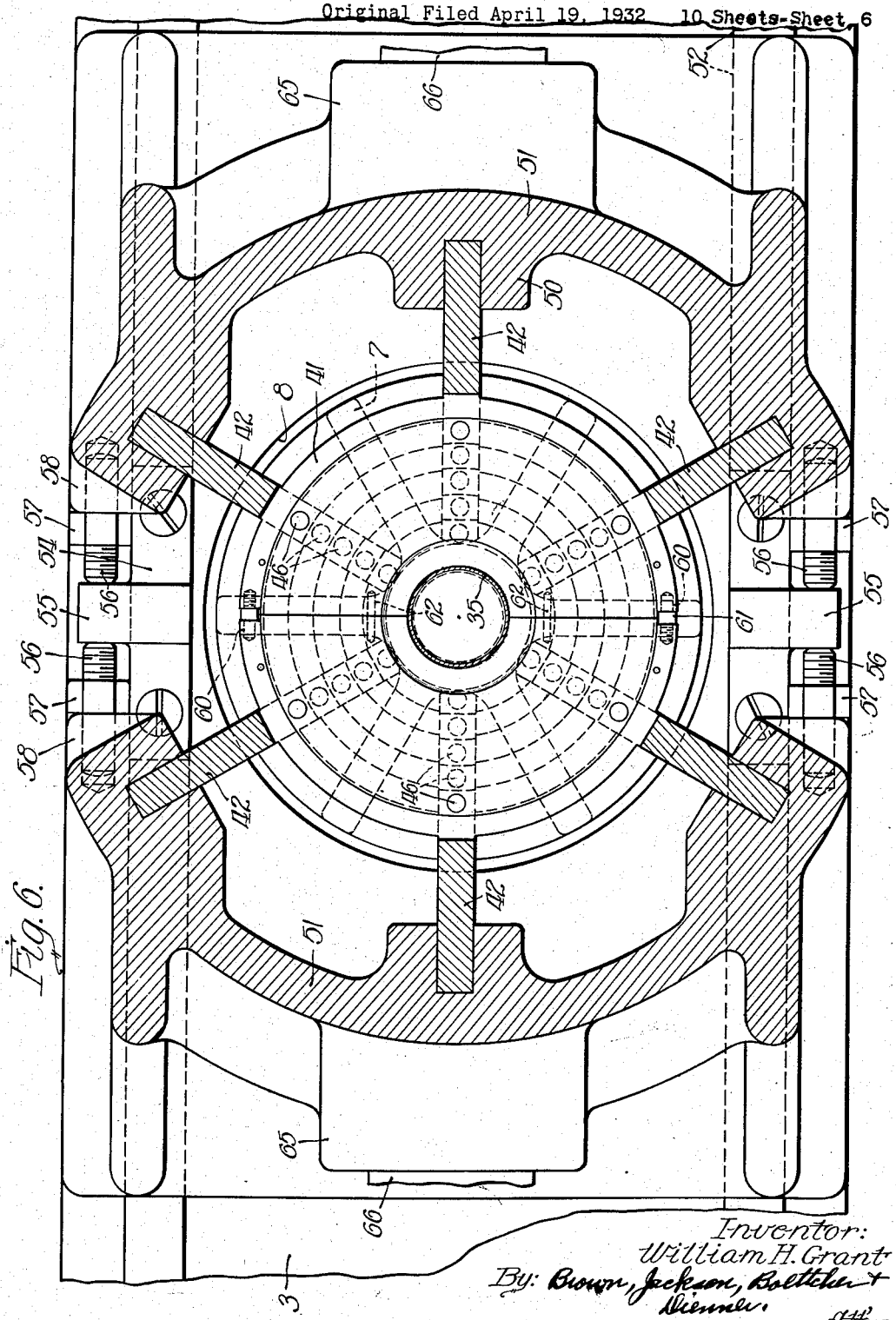
Figure 6 is a section taken substantially on line 6—6 of Figure 5.

Referring to Figs. 5 and 7, it will be noted that the dies are disposed in spaced relation and are, in effect, clamped around the blank by the radial bulging thereof. Each die is attached to an associated holder 41, the die and the holder together possessing appreciable weight. The combined weights of the dies and their associated holders, beyond any given die with the holder of which spider 7 contacts in the travel of the ram, will resist axial compression of the blank, and thus resistance will increase in accordance with the number of dies and associated holders beyond the head 12. Accordingly, the bulge or segment of the blank between the die carried by the holder with which spider 7 contacts and the next adjacent die normally offers least resistance to radial extension and will be formed to final size and shape before any of the other corrugations of the blank. The weight of the dies and the holders is a factor which supplements the resistance of the bulges of the blank to axial compression of the latter, and cooperates therewith to assure the forming of the corrugations of the bellows to final size and shape successively and individually.

The corrugations of the bellows are not necessarily in all instances formed to final size and shape both successively and consecutively, though this is the general tendency and should usually occur. In some instances, however, it may happen that a bulge in the blank will be formed to a corrugation of final size and shape before another bulge nearer the head 12. This may be accounted for by the fact, previously referred to, that the temper, wall thickness or grain structure of the portion of the blank defining that particular bulge is such as to offer appreciably less resistance to axial compression and radial extension than any other bulge nearer the end of the blank subjected to pressure by the ram. For example, referring to Fig. 7, it may happen that the bulge of the blank between the second and third dies from the head 12 offers relatively little resistance to axial compression and radial extension. In the travel of the ram toward head 22, the bulge between head 12 and the first or lowermost die may be formed first, to a corrugation of final size and shape, the bulge between the second and third dies may be next formed to a corrugation of final size and shape, due to its relatively slight resistance to axial compression and radial extension, the bulge between the first and second dies being formed to a corrugation of final size and shape after the bulge between the second and third dies. However, the bulges of the blank are formed to corrugations of final size and shape individually and successively, and the general tendency is for them to be formed to final size and shape both successively and consecutively.

While the above is thought to be a correct explanation of the causes for the bulges of the blank being formed individually and successively to corrugations of final size and shape in the manner stated, it is appreciated that there may possibly be other factors not apparent which affect the result obtained. However, the above stated theory of operation is believed to be, in the main at least, correct, and the corrugations are formed to final size and shape successively, as stated.

The herein disclosed method constitutes the subject matter of my copending application for Method of corrugating tubes, Serial No. 650,827, filed January 9, 1933, and is claimed therein.

The water supply pipe 105 and associated parts, for supplying water to the tubular blank, are preferably provided but are not essential. The advantage of this water supply means is that it avoids the necessity of frequently replenishing the supply of water in tank 116. It will be understood, however, that the entire supply of water for filling the tubular blank and subjecting it to internal pressure may be had through the pipe 107, if desired. Also, if desired, the tubular blank and associated passages of the valve block and associated parts may be filled by pouring water through a suitable nipple or equivalent member secured in the upper end of passage 76 in place of the pet-cock 98. Also, the provision of the suction pump 101 and the suction valve and associated parts is not essential, though preferred.

While I preferably apply the bulging internal pressure to the tubular blank before subjecting it to endwise pressure, this is not essential, and both the internal pressure and the endwise pressure may be applied to the blank simultaneously if desired.

In the modified form illustrated in Figure 12, the cross-heads 51 and the spider 7 and the pressure head 12 are operated by hydraulic means. Cylinders 175 are mounted upon side members 4 of frame 1. Pistons 176 operate in these cylinders, these pistons being carried by piston rods 177 which operate through stuffing boxes 178, the inner ends of these rods being pinned at 179 to bosses 65 of the cross-heads. Communicating tubes 180 communicate with cylinders 175 through the outer ends thereof, and a tube 181 communicates with the inner ends of the cylinders 175. Pressure for operating the pistons 176 is supplied through a pipe 182 which communicates with the casing of a suitable four-way valve 183, a relief pipe 184 also communicating with the casing of this valve. When the valve is turned into one position, the tubes 180 are connected to the supply of water or other liquid under pressure so as to force the pistons 176 inwardly of the cylinders 175, tube 181 being connected to the relief pipe 184 so as to permit escape of water from in front of the pistons 176. When the position of valve 183 is reversed, tube 181 is connected to the supply of liquid under pressure and tubes 180 are connected to the relief pipe for moving the pistons 176 outwardly and retracting the cross-heads 51.

A cylinder 185 is bolted to the under face of base plate 3 of the frame. A piston 186 operates in this cylinder and is provided with an adjustable stop 187 which contacts the lower head of the cylinder to limit downward movement of the piston. Piston rod 188 operates through a stuffing box 189 and spider 7 is pinned on the upper end of piston rod 189, at 190. A tube 191 communicates with the upper end of cylinder 185 and with a valve casing 192 in which is mounted a four-way valve 193 of known type. A pressure supply pipe 194 also communicates with the valve casing, as does a relief pipe 195. A tube 196 communicates with cylinder 185 through the lower end thereof and with valve casing 192. By proper manipulation of valve 193, piston 186 and piston rods 189 may be raised and lowered under pressure as required.

With the exception of the hydraulic means for operating the cross-heads 51 and the spider 7 and pressure head 12, the construction and operation of the machine of Figure 12 is similar to that of the machine of Figures 1 to 11, inclusive, and need not be further described.

The machine of my invention so far described is adapted for corrugating a tubular metal blank closed at one end. In Figures 13 to 15, I have illustrated a slight modification of the tube mounting and securing means by means of which the machine is adapted for corrugating metal blanks open at both ends. In Figure 13 the pressure inlet tube 19b is provided, at its lower end, with a reduced neck 19c, which is threaded for reception of a flanged nut 200. This nut is formed in two sections 200a and 200b which are hinged together at 201. Section 200a is provided with a slotted lug 202 for reception of a swing bolt 203 pivoted at 204 in a slotted lug 205 formed integrally with section 200b. A wing nut 206 screws onto bolt 203 and contacts lug 201 for releasably securing the two sections of the nut together. A disc 207 is suitably secured, as by means of screws 208 to the upper face of pressure head 12b. The disc 207 is formed in two sections 207a of semi-circular shape, each section having a recess 209 corresponding to the recess of the head 12 of Figure 5. Flange 200a of nut 200 is provided in its under face with a recess 40a corresponding to recess 40 of the nut 25 of Figure 5. This flange 200a is adapted to engage beneath a flange 35b at the upper end of a tubular blank 35a, this blank being open at its lower end and provided at such end with a second flange 35b. A gasket 210 is disposed between flange 35b at the upper end of the blank 35a and the under face of extension 19c of tube 19b. The nut serves to clamp the blank 35a tightly in position and, in conjunction with gasket 210, to provide a fluid tight and pressure resistant closure between the upper end of the blank and the lower end of the extension 19c. Sections 207a of disc 207 seat upon the upper face of flange 35b at the lower end of blank 35a, and a gasket 211 is interposed between this flange and the upper face of pressure head 12b. The sections 207a of disc 207 completely encircle the blank 35a and are pressed tightly down against flange 35b by means of the screws 208 so as to anchor securely the lower end of blank 35a and provide a fluid tight and pressure resistant closure between the flange 35b and head 12b. This provides simple and highly efficient means for effectively securing the ends of a tubular blank which is open at both ends. I do not, however, limit myself to the particular securing means shown, since various other means may be employed for securing the ends of the blank and providing fluid tight and pressure resistant closures therewith, as will be understood by those skilled in the art.

What I claim is:—

1. In a machine of the character stated, means for supporting a tubular metal blank and for subjecting it to internal pressure and to endwise pressure, slidably mounted die carriers movable into and out of operative relation to the blank, and sectional die rings mounted in the carriers and free from each other for independent relative movement toward and away from each other and disposed to be positioned about the blank in spaced relation lengthwise thereof when said carriers are in operative relation to the blank.

2. In a machine of the character stated, means for supporting a tubular metal blank and for subjecting it to internal pressure, die carriers movable into and out of operative relation to the blank, sectional die ring structures mounted in the carriers and free for independent relative movement toward and away from each other and disposed to be positioned about the blank in spaced relation lengthwise thereof when said carriers are in operative relation to the blank, and means for compressing the blank axially and for contacting the ring structures successively and positively moving the rings toward each other.

3. In a machine of the character stated, means for securing a tubular blank at one end and for subjecting it to internal pressure, means for applying endwise pressure to the blank at the other end thereof, die carriers movable into and out of operative relation to the blank, sectional die ring structure mounted in the carriers and free for independent relative movement toward and away from each other and disposed to be positioned about the blank in spaced relation lengthwise thereof when said carriers are in operative relation to the blank, and means supplemental to the endwise pressure applying means disposed to successively contact the die ring structure and positively move said rings toward each other.

4. In a machine of the character stated, an upper securing head having means for securing thereto the upper end of a tubular blank, means for supplying fluid under pressure to the interior of the blank through said head, a lower pressure head coaxial with and movable toward and away from the upper head, slidably mounted die carriers movable into and out of operative relation to a blank secured to the upper head, and die structures including sectional die rings mounted in the carriers in superposed spaced relation and free for independent movement toward and away from each other, said rings being disposed to be positioned about the blank when said carriers are in operative relation thereto.

5. In a machine of the character stated, an upper securing head having means for securing thereto the upper end of a tubular blank, means for supplying fluid under pressure to the interior of the blank through said head, a lower pressure head coaxial with and movable toward and away from the upper head, die carriers movable into and out of operative relation to a blank secured to the upper head, die structures including sectional die rings mounted in the carriers in superposed spaced relation and free for independent movement toward and away from each other, said rings being disposed to be positioned about the blank when said carriers are in operative relation thereto, and means supplemental to the lower head and disposed to successively contact the die structures and positively move them upwardly with said lower head.

6. In a machine of the character stated, coaxial upper and lower heads having relative movement toward and away from each other, means for securing a tubular blank in position between the heads and for supplying fluid under pressure to the interior of the blank, slidably mounted die carriers movable normal to the blank into and out of operative relation thereto, and die structures including sectional die rings mounted in the carriers in superposed spaced relation and free for independent movement toward and away from each other, said rings being disposed to be positioned about the blank when said carriers are in operative relation thereto.

7. In a machine of the character stated, coaxial upper and lower heads having relative movement toward and away from each other, means for securing a tubular blank in position between the heads and for supplying fluid under pressure to the interior of the blank, die carriers movable normal to the blank into and out of operative relation thereto, die structures including sectional die rings mounted in the carriers in superposed spaced relation and free for independent movement toward and away from each other, said rings being disposed to be positioned about the blank when said carriers are in operative relation thereto, and means disposed to successively contact the die structures and move them toward each other during relative movement of the heads toward each other.

8. In a machine of the character stated, coaxial upper and lower heads having relative movement toward and away from each other, means for securing a tubular blank in position between the heads and for supplying fluid under pressure to the interior of the blank, cross-heads slidably mounted at opposite sides of the blank and movable into and out of operative relation thereto, sectional die holders supported by the cross-heads in superposed spaced relation and free from each other for independent relative vertical movement, and sectional die rings carried by the holders and disposed to be positioned about the blank when said cross-heads are in operative relation thereto.

9. In a machine of the character stated, coaxial upper and lower heads having relative movement toward and away from each other, means for securing a tubular blank in position between the heads and for supplying fluid under pressure to the interior of the blank, cross-heads at opposite sides of the blank and movable into and out of operative relation thereto, spaced supports carried by the respective cross-heads, sectional die holders mounted on the supports in superposed relation and for relative vertical movement, sectional die rings carried by the holders and disposed to be positioned about the blank when said cross-heads are in operative relation thereto, and means operable between the supports for contacting said holders and imparting thereto positive movement toward each other during relative movement of the heads toward each other.

10. In a machine of the character stated, coaxial upper and lower heads having relative movement toward and away from each other, means for securing a tubular blank in position between the heads and for supplying fluid under pressure to the interior of the blank, cross-heads at opposite sides of the blank and movable into and out of operative relation thereto, spaced supports carried by the respective cross-heads, sectional die holders mounted on the supports in superposed relation and slidably connected to each other and to the supports for relative vertical movement, and sectional die rings carried by the holders and disposed to be positioned about the blank when said cross-heads are in operative relation thereto.

11. In a machine of the character stated, coaxial upper and lower heads, the lower head being movable toward and away from the upper head, means for securing a tubular blank in position between the heads and for supplying fluid under pressure to the interior of the blank, cross-heads movable into and out of operative relation to the blank, spaced supports carried by the respective cross-heads, sectional die holders mounted on the supports in telescoping relation and held against relative turning movement, sectional die rings secured to the upper ends of the holders and disposed to be positioned about the blank when the cross-heads are in operative relation to said blank, means for forcing the lower head toward the upper head, and means operating between the supports for successively contacting the die holders and positively moving them upwardly with the lower head.

12. In a machine of the character stated, coaxial upper and lower heads, the lower head being movable toward and away from the upper head, means for securing a tabular blank in position between the heads and for supplying fluid under pressure to the interior of the blank, cross-heads movable into and out of operative relation to the blank, spaced supports carried by the respective cross-heads, sectional die holders mounted on the supports in telescoping relation and held against relative turning movement, sectional die rings secured to the upper ends of the holders and disposed to be positioned about the blank when the cross-heads are in operative relation to said blank, means for limiting downward movement of the respective die holders relative to the supports, means for forcing the lower head toward the upper head, and means operating between the supports for successively contacting the die holders and positively moving them upwardly with the lower head.

13. In a machine of the character stated, coaxial upper and lower heads, the lower head being movable toward and away from the upper head, means for securing a tubular blank in position between the heads and for supplying fluid under pressure to the interior of the blank, cross-heads movable into and out of operative relation to the blank, spaced supports of stepped construction carried by the cross-heads, sectional die holders mounted on the supports in telescoping relation and held against relative turning movement, said holders normally seating on the steps of the supports, sectional die rings secured to the upper ends of the holders and disposed to be positioned about the blank when the cross-heads are in operative relation to said blank, means for forcing the lower head toward the upper head, and means operating between the supports for successively contacting the die holders and positively moving them upwardly with the lower head.

14. In a machine for corrugating metal tubes, means for subjecting a tubular metal blank to internal pressure and to endwise pressure, and die means cooperating with said pressure means for forming preliminary corrugations in the blank and thereafter successively and positively shaping said preliminary corrugations to final form and size as a continuous operation.

15. In a machine for corrugating metal tubes, a plurality of ring dies positionable about a blank in operative relation thereto and spaced apart lengthwise of the blank, means for supporting a tubular metal blank in operative relation to the dies and for subjecting the blank to internal pressure and to endwise pressure and thereby flowing the wall of the blank between the dies and forming preliminary corrugations in the blank, said dies being free one from the other and having independent relative movement lengthwise of the blank during the preliminary corrugating thereof, and means for thereafter positively and successively moving the dies together and thereby successively shaping the corrugations of the blank to final form and size.

16. In a machine for corrugating metal tubes, two heads disposed for reception therebetween of a tubular metal blank to be corrugated, a plurality of ring dies positionable about the blank in operative relation thereto and spaced apart lengthwise of the blank, means for subjecting the blank to internal pressure, means for moving one of the heads toward the other head and subjecting the blank to endwise pressure while maintaining the pressure within the blank and thereby flowing the wall of the blank between the dies and forming preliminary corrugations in the blank, said dies being free one from the other and having independent relative movement lengthwise of the blank during the preliminary corrugating thereof, and means actuated by the movable head and disposed to contact the dies successively and positively move them together and thereby successively shape the corrugations of the blank to final form and size, after predetermined movement of said movable head toward the other head.

17. In a machine for corrugating metal tubes, two heads disposed for reception therebetween of a tubular metal blank to be corrugated, a plurality of die carriers disposed in telescoping and stepped relation and slidably connected for independent relative movement lengthwise of the blank, ring dies mounted on the carriers and positionable about the blank in operative relation thereto, means for subjecting the blank to internal pressure, means for moving one of the heads toward the other head and subjecting the blank to endwise pressure while maintaining the pressure within the blank and thereby flowing the wall of the blank between the dies and forming preliminary corrugations in the blank, and a member associated with the movable head and disposed to contact said carriers successively in the continued travel of the movable head and after predetermined movement thereof and thereby positively and successively move the dies together whereby the preliminary corrugations of the blank are successively shaped to final form and size.

WILLIAM H. GRANT.